(12) United States Patent
Le Gonidec

(10) Patent No.: US 8,377,602 B2
(45) Date of Patent: Feb. 19, 2013

(54) SYSTEM AND A METHOD FOR REGULATING THE TEMPERATURE OF A FUEL CELL

(75) Inventor: Serge Le Gonidec, Vernon (FR)

(73) Assignee: SNECMA, Paris (FR)

( * ) Notice: Subject to any disclaimer, the term of this patent is extended or adjusted under 35 U.S.C. 154(b) by 875 days.

(21) Appl. No.: 12/171,554

(22) Filed: Jul. 11, 2008

(65) Prior Publication Data

US 2009/0029214 A1  Jan. 29, 2009

(30) Foreign Application Priority Data

Jul. 12, 2007  (FR) ..................................... 07 56460

(51) Int. Cl.
*H01M 8/04* (2006.01)
*H01M 8/02* (2006.01)
(52) U.S. Cl. .................... 429/434; 429/437; 429/442
(58) Field of Classification Search .................. None
See application file for complete search history.

(56) References Cited

U.S. PATENT DOCUMENTS

| | | | |
|---|---|---|---|
| 6,087,028 A | 7/2000 | Goto | |
| 6,186,254 B1 | 2/2001 | Mufford et al. | |
| 2006/0263651 A1* | 11/2006 | Fagley et al. | 429/13 |
| 2006/0263652 A1* | 11/2006 | Logan | 429/13 |

FOREIGN PATENT DOCUMENTS

| | | |
|---|---|---|
| JP | 2002-184435 A | 6/2002 |
| WO | 2005/043661 A | 5/2005 |

OTHER PUBLICATIONS

French Search Report dated Feb. 28, 2008, issued in priority application FR 0756460 (FR696029) (2 pgs).

* cited by examiner

*Primary Examiner* — John S Maples
(74) *Attorney, Agent, or Firm* — Preti Flaherty Beliveau & Pachios LLP

(57) ABSTRACT

The invention relates to a system for regulating the temperature of a fuel cell that is cooled by a cooling fluid traveling through the cell, the system including both first control means for measuring the temperature of the cooling fluid and for controlling the flow rate of the controlling fluid as a function of said measured temperature of said cooling fluid, comprising second control means for measuring the flow rate of the cooling fluid and for controlling the temperature of the cooling fluid as a function of a flow rate difference between the command flow rate specified by said first control means and said corresponding measured flow rate of the cooling fluid such that said command temperature specified by the second control means compensates for said flow rate difference.

7 Claims, 4 Drawing Sheets

SYSTEM AND A METHOD FOR REGULATING THE TEMPERATURE OF A FUEL CELL

This application claims priority to French Appln. No. 07 56460 filed Jul. 12, 2007.

BACKGROUND OF THE INVENTION

The invention relates to regulating the temperature of an electrical power supply device. The field of application of the invention is more particularly that of cells, in particular fuel cells.

The purpose of regulating the temperature of a fuel cell is to compensate for thermal disturbances in the cell and/or to track a change in the setpoint for the temperature of the cell. In general, the temperature of a fuel cell is regulated by a cooling fluid flowing through a cooling circuit.

A traditional scheme for regulating the temperature of a fuel cell is shown in FIG. 5. In that scheme, the cell 101 is cooled by a cooling fluid traveling through the cell 101 via a cooling circuit 109 that passes through the bipolar plates of the cell so as to absorb the heat given off by the reaction in the cell 101. The cooling fluid is fed from a cold source 111 connected to the cooling circuit 109. Furthermore, the cooling circuit 109 is controlled by a control loop 105 provided with control means 105a that regulate the flow rate Qc of the cooling fluid as a function of a measurement of the temperature Tsm of the cooling fluid at the outlet from the cell 101.

Nevertheless, the control loop 105 responds solely to needs for servo-controlling the temperature of the cell 101 and does not respond to safety problems that might arise, e.g. in the event of failure in varying the flow rate of the cooling fluid, or in the event of other kinds of failure.

OBJECT AND SUMMARY OF THE INVENTION

To this end, the invention provides a system for regulating the temperature of a fuel cell that is cooled by a cooling fluid traveling through the cell, the system including both first control means for measuring the temperature of the cooling fluid and for controlling the flow rate of the controlling fluid as a function of said measured temperature of said cooling fluid, and also second control means for measuring the flow rate of the cooling fluid and for controlling the temperature of the cooling fluid as a function of a flow rate difference between the command flow rate specified by said first control means and said corresponding measured flow rate of the cooling fluid such that said command temperature specified by the second control means compensates for said flow rate difference.

Thus, in the event of a failure in the cooling fluid feed, e.g. in the event of its cooling capacities no longer being covered by the flow rate correction (not enough heat being extracted), the temperature command as specified in this way enables the cell to be maintained at a temperature that is acceptable, thereby maintaining its performance and increasing its lifetime.

The system includes temperature compensation means for determining the value of the command temperature for the cooling fluid as specified by said second control means by comparing the command flow rate specified by said first control means with the corresponding measurement of the flow rate taken by said second control means.

Thus, the temperature compensation means enable any disturbance in the flow rate of the cooling fluid to be compensated in simple and accurate manner.

According to a feature of the present invention, the temperature measurement of the cooling fluid to which the first control means responds, itself corresponds to measuring the outlet temperature from the cell, and the command temperature for the cooling fluid as specified by the second control means corresponds to the inlet temperature of the cell.

This embodiment serves to increase the accuracy with which the temperature of the cell is regulated by taking account of a plurality of variables (specifically: inlet temperature, outlet temperature that is a good representation of heat exchange, and flow rate) that might affect the heat power exchanged between the cooling fluid and the cell.

Advantageously, the system includes temperature correction means to adapt the command inlet temperature as a function of the difference between a desired inlet temperature and the corresponding measurement of said inlet temperature.

This makes it possible to optimize the lifetime and the performance of the cell by compensating for temperature errors at the inlet to the cell. In particular, this makes it possible to cover uncertainties in the temperature regulation of a cold source for the cooling fluid and to compensate for heat losses in a cooling fluid feed line.

In an embodiment of the present invention, the regulation system comprises:

a first temperature sensor for measuring said outlet temperature of the cooling fluid at the outlet from the fuel cell;

first validation means for validating said measurement of outlet temperature;

first comparator means for comparing said validated measurement of outlet temperature with a predetermined setpoint outlet temperature in order to detect any outlet temperature difference;

first corrector means for determining the command flow rate for the cooling fluid as specified by said first control means as a function of said outlet temperature difference; and first filter means for filtering said command flow rate.

This makes it possible to regulate the flow rate of the cooling fluid while protecting the regulation system and the cell against a command flow rate that constitutes an aberration.

The system further comprises:

a flow rate sensor for measuring the flow rate of the cooling fluid;

second validation means for validating said flow rate measurement;

second comparator means for comparing the validated measured flow rate of the cooling fluid with said command flow rate specified by the first control loop in order to determine said flow rate difference;

second filter means for filtering said flow rate difference;

second corrector means for determining the temperature correction to be applied to a predetermined setpoint inlet temperature;

third filter means for filtering said inlet temperature correction; and adder means for adding said temperature correction to the predetermined setpoint inlet temperature in order to define said command inlet temperature specified by the second control means.

This makes it possible to compensate for a temperature disturbance caused by any flow rate difference by acting on the temperature of the fluid while protecting the regulation system and the cell against any command temperature that constitutes an aberration.

The system further comprises:

a second temperature sensor for measuring the inlet temperature of the cooling fluid at the inlet to the cell;

third validation means for validating the measurement of said inlet temperature;

third comparator means for comparing said validated measurement of the inlet temperature with said command inlet temperature from the second control means in order to detect any inlet temperature difference;

third corrector means for adapting the command inlet temperature as a function of said inlet temperature difference; and fourth filter means for filtering said command inlet temperature.

This makes it possible to compensate temperature losses from the cooling fluid prior to entering into the cell, while protecting the regulation system and the cell against any command temperature that is erroneous.

Advantageously, each of said first, second, and third corrector means includes a respective integrator provided with an anti-windup type protection means. This makes it possible to avoid errors due to saturation between the various commands or measurements in order to preserve the stability and the performance of the control loop.

The invention also provides a fuel cell including a regulation system in accordance with at least one of the above characteristics and a cooling circuit for cooling the cell by means of a cooling fluid, said cooling circuit being connected to the regulation system to receive therefrom the command flow rate and/or the command temperature.

The invention also provides a method of regulating the temperature of a fuel cell that is cooled by a cooling fluid passing through the cell, the method comprising the following steps:

measuring the temperature of the cooling fluid; and
specifying a command flow rate for said cooling fluid as a function of said temperature measurement;
measuring the flow rate of the cooling fluid; and
controlling the temperature of the cooling fluid as a function of a difference between the measured flow rate of the cooling fluid and the command flow rate for said cooling fluid in order to compensate for failure of temperature regulation caused by said flow rate difference.

The flow rate of the cooling fluid is controlled as a function of the measured outlet temperature Tsm from the fuel cell, and the command temperature for the cooling fluid corresponds to the command inlet temperature Te for the fuel cell.

Advantageously, the method includes a temperature correction step for correcting the command inlet temperature Tec as a function of a difference between a desired inlet temperature and the corresponding measurement of said inlet temperature.

BRIEF LIST OF DRAWINGS

The invention can be better understood on reading the following description given by way of non-limiting indication and with reference to the accompanying drawings, in which.

DETAILED DESCRIPTION OF EMBODIMENTS OF THE INVENTION

Figure 1:
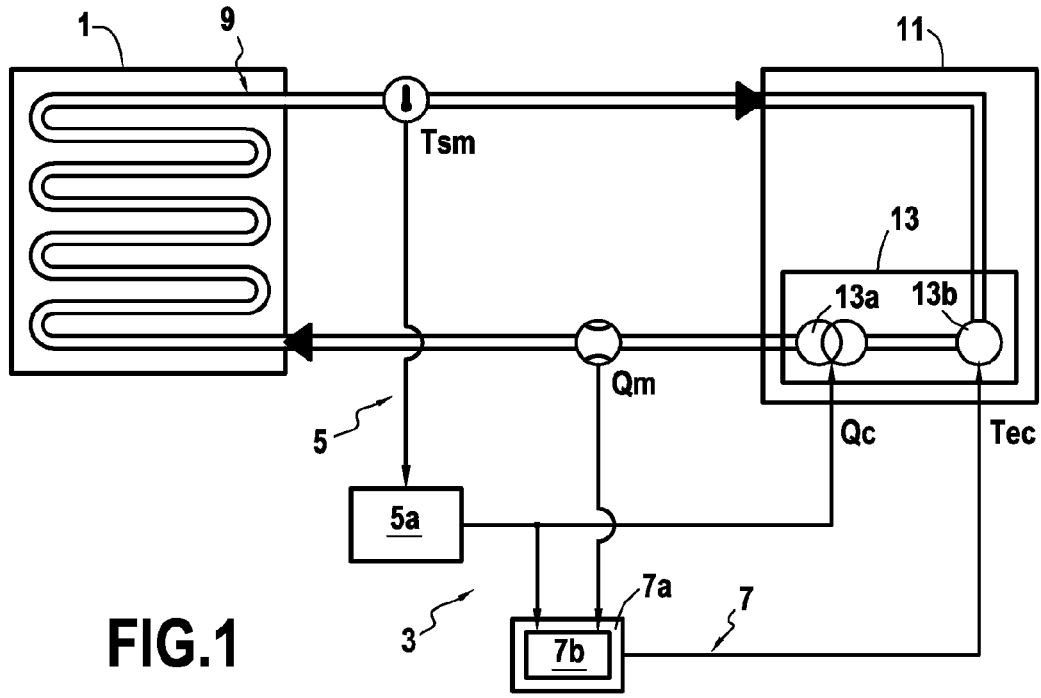
FIG. 1 is a diagrammatic view of apparatus comprising a fuel cell and a system of the invention for regulating the temperature of the cell.

FIG. 1 is a diagram of apparatus comprising a fuel cell 1 and a system 3 for regulating the temperature of the fuel cell 1, which is cooled by a cooling fluid passing through the cell 1.

The temperature regulation system 3 has a first control loop 5 coupled to a second control loop 7. It should be observed that the first and second control loops are associated with control means 5a, 7a adapted to operate these control loops. The first control loop 5 includes first control means 5a that take a measurement of the temperature Tsm of the cooling fluid and specify a flow rate command Qc for controlling the flow rate of the cooling fluid as a function of the measured temperature Tsm of the cooling fluid. The second control loop 7 is coupled to the first control loop 5 via second control means 7a. The second control means take the measurement of the flow rate Qm of the cooling fluid and specify a command temperature Tec for the cooling fluid as a function of a flow rate difference between the command flow rate Qc specified by the first control loop 5 and the corresponding measured flow rate Qm of the cooling fluid, such that the command temperature Tec specified by the second control loop 7 compensates for any potential failure of the thermal regulation caused by the flow rate difference. It should be observed that the flow rate, or more precisely the weight of cooling fluid that is heated, gives an indication concerning the heat power exchanged between the cooling fluid and the fuel cell 1.

Figure 3:
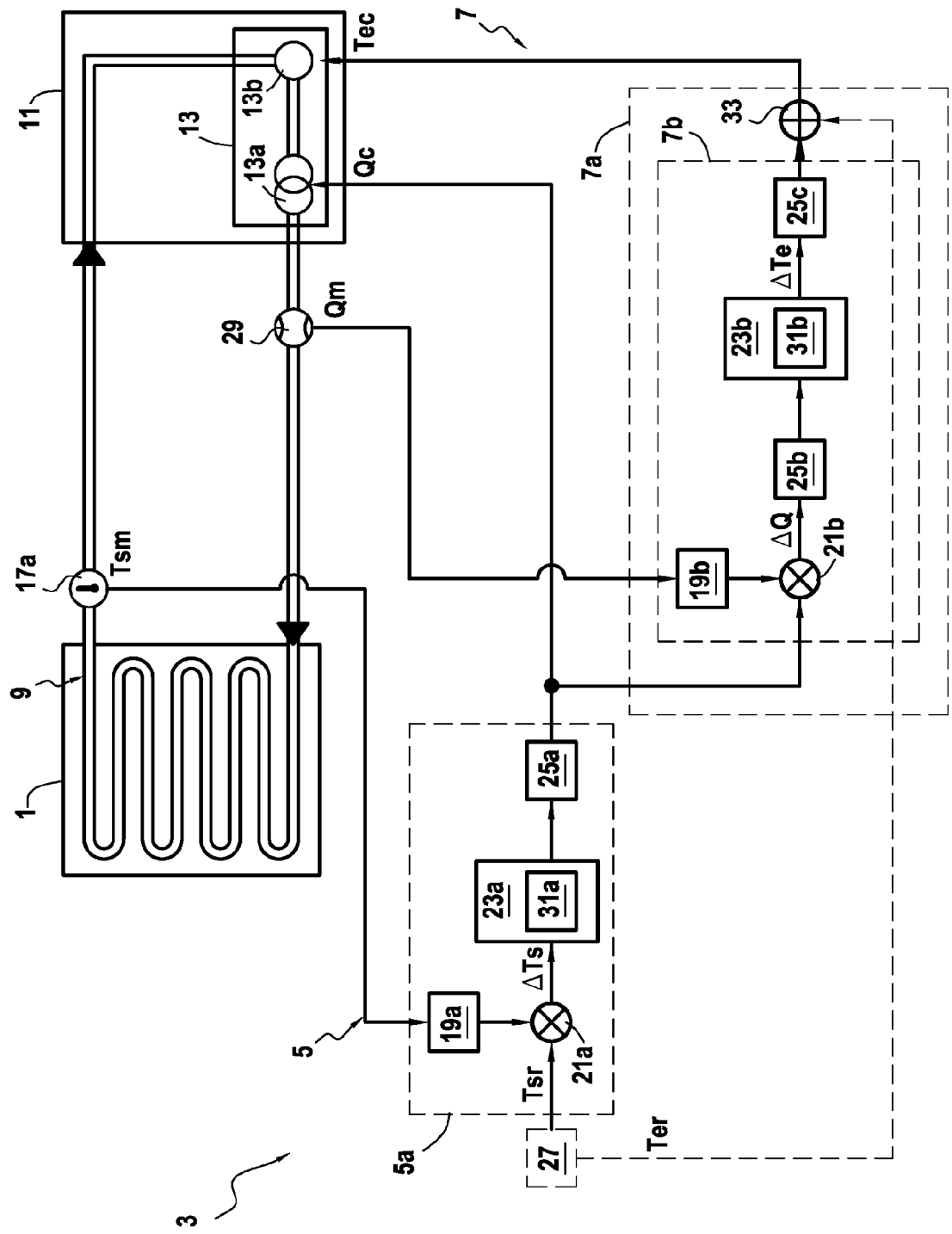
FIG. 3 is a more detailed view of an embodiment of the fuel cell temperature regulation system of FIG. 1.

More particularly, the apparatus of FIG. 1 shows that the cooling of the fuel cell 1 is provided by a cooling circuit 9 that passes through the bipolar plates (not shown) of the cell 1, thereby absorbing the heat given off by the reaction in the cell 1. The cooling circuit 9 is connected to a cold source 11 including regulation means 13 for regulating the temperature of the cooling fluid. By way of example, the cooling fluid may be water or any other fluid that provides good transport of heat. Thus, prior to entering the cooling circuit 9 of the cell 1, the cooling fluid passes through the cold source 11 that serves to bring the temperature of the cooling fluid to a setpoint or reference value Tsr. It should be observed initially that the command temperature Tec is equal to the setpoint temperature Tsr. As shown in FIG. 3, this setpoint temperature Tsr is provided by a setpoint temperature control device 27 that is external to the temperature regulation system but that could be internal. Thus, when the setpoint temperature Tsr of the cooling fluid is under control, the temperature of the cell 1 is regulated by modulating the flow rate at its inlet.

Advantageously, the temperature measurement of the cooling fluid to which the first control loop 5 responds is a measurement of its temperature Tsm at the outlet from the cell 1. The temperature of the cooling fluid at the outlet from the fuel cell 1 is appropriately representative of the overall temperature of the cell 1. Thus, in order to regulate the temperature of the fuel cell 1, the first control loop 5 modulates the flow rate of the cooling fluid at the inlet to the cell 1 by acting on a flow rate actuator 13a located outside the cell 1, e.g. in the regulation means 13 of the cold source 11.

Furthermore, it should be observed that the heat power exchanged between the cooling fluid and the fuel cell 1 is also associated with the temperature difference between the cooling fluid at the inlet and at the outlet of the fuel cell 1. Thus, adjusting the temperature of the cooling fluid can provide second means for taking action to regulate the temperature of the fuel cell 1.

In the event of the flow rate actuator 13a that modulates the flow rate of the cooling fluid becoming saturated, the second control loop 7 modulates the temperature of the cooling fluid before it enters into the fuel cell 1 by acting on a temperature actuator 13b disposed in the regulation means 13 of the cold source 11. Thus, controlling the temperature of the cooling fluid corresponds to a fallback position in the event of modulation being unavailable for the main control (flow rate control).

More particularly, the second control loop 7 includes temperature compensation means 7b for determining the value of the command temperature Tec for the cooling fluid as specified by the second control loop 7 on comparing the command flow rate Qc specified by the first control loop 5 and the corresponding measurement of the flow rate Qm as performed by the second control loop 7.

Although the above description relates to the first control loop 5 acting in response to measuring the outlet temperature Tsm from the cell 1, and to the second control loop 7 acting in response to measuring the flow rate at the inlet to the cell 1, other possibilities could be envisaged.

It should be observed that FIG. 1 also shows the main steps in the regulation method of the invention in which the temperature of the cooling fluid is measured, the flow rate of the cooling fluid is controlled as a function of the temperature measurement, the flow rate of the cooling fluid is measured, and the temperature of the cooling fluid is controlled as a function of the difference between the measured cooling fluid flow rate and the command flow rate for the cooling fluid, in order to compensate for a failure of temperature regulation caused by the flow rate difference.

Figure 2:
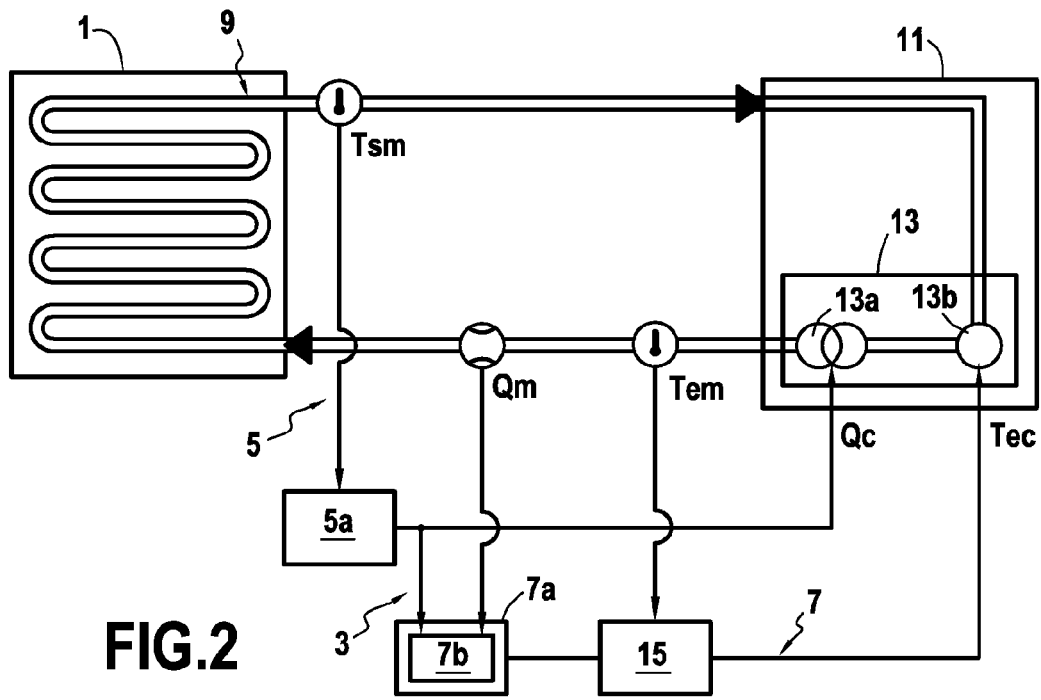
FIG. 2 is a diagrammatic view of another embodiment of a temperature regulation system of the invention.

FIG. 2 shows another embodiment of a temperature regulation system 3 for a fuel cell 1 that includes temperature correction means 15 in addition to the first and second control loops 5 and 7 as described above.

This system corresponds to multi-level regulation of the temperature of the cell 1 comprising a first control loop 5 coupled with a second control loop 7 and temperature control means 15. The temperature control means serve to adapt the inlet command temperature Tec as a function of a difference between the desired inlet temperature and the corresponding measurement of the inlet temperature Tem of the cooling fluid.

Similarly, FIG. 2 also illustrates the main steps of the regulation method of the invention that includes in addition to the steps of FIG. 1, a temperature correction step for correcting the inlet command temperature Tec.

FIG. 3 is a more detailed view of an embodiment of the temperature regulation system 3 for the fuel cell 1 of FIG. 1.

FIG. 3 shows that the first control loop 5 includes a first temperature sensor 17a, first validation means 19a, first comparator means 21a, first corrector means 23a, and first filter means 25a.

The first temperature sensor 17a serves to measure the outlet temperature Tsm of the cooling fluid at the outlet from the cell 1, thus giving a good indication of the temperature of the cell 1. It should be observed that the first temperature sensor 17a may correspond to a plurality of temperature sensors for taking a plurality of measurements in parallel.

The first validation means 19a serve to validate the measured outlet temperature Tsm. In particular, a plurality of temperature measurements can be taken in parallel by the first temperature sensor 17a prior to being filtered and validated by the first validation means 19a, in order to ensure that the measured outlet temperature Tsm is correct.

The first comparator means 21a serve to compare the validated measured outlet temperature Tsm with a predetermined reference outlet temperature Tsr in order to detect any possible outlet temperature difference ($\Delta Ts = Tsm - Tsr$). The setpoint outlet temperature Tsr and optionally the setpoint inlet temperature Ter are temperatures that are predetermined by a control device 27 (shown in dashed lines).

The first corrector means 23a comprise a first integrator 31a provided with amplitude protection means (anti-windup means) serving to determine the command flow rate Qc for the cooling fluid as a function of the outlet temperature difference $\Delta Ts$. Thus, the command flow rate Qc specified by the first control loop 5 can be modulated in order to regulate the temperature of the cell 1.

The first filter means 25a serves to filter the command flow rate Qc in speed and in amplitude prior to sending the command to the cold source 11, for the purpose of protecting the apparatus against aberrations in the command flow rate. Prior to being sent to the cold source 11 in order to act on the flow rate actuator 13a of the cooling circuit 9, the command flow rate Qc specified by the first corrector means 23a is subjected to limitation both in amplitude and in speed in compliance with the maximum performance that can be expected of the apparatus.

Thus, the first control loop 5 regulates the outlet temperature of the cooling fluid at the outlet from the cell 1 by specifying a command flow rate Qc to adjust the flow rate of the cooling fluid through the cooling circuit 9.

The second control loop 7 comprises a flow rate sensor 29, second validation means 19b, second comparator means 21b, second filter means 25b, second corrector means 23b, third filter means 25c, and adder means 33.

The flow rate sensor 29 serves to measure the flow rate Qm of the cooling fluid in the cooling circuit 9, e.g. on entry into the fuel cell 1. It should be observed that the flow rate sensor 29 may correspond to a plurality of flow rate sensors in order to take a plurality of measurements in parallel.

The second validation means 19b serve to validate the measured flow rate Qm. In particular, a plurality of flow rate measurements may be taken in parallel by the flow rate sensor 29 prior to being filtered and validated by the second validation means 19b in order to ensure that the measured flow rate Qm is correct.

The second comparator means 21b serve to compare the validated measured flow rate Qm of the cooling fluid with the command flow rate Qc specified by the first control loop 5 in order to determine whether there is any flow rate difference $\Delta Q = Qm - Qc$.

The second filter means 25b serve to filter this flow rate difference $\Delta Q$ in order to limit its amplitude prior to applying it to the second corrector means 23b.

The second corrector means 23b serve to determine the temperature correction $\Delta Te$ relative to a predetermined setpoint or reference inlet temperature Ter. The setpoint inlet temperature Ter is a temperature that is predetermined by the control device 27. This setpoint inlet temperature Ter can be set initially to a temperature that is a few degrees (e.g. 10° C.) lower than the desired outlet setpoint temperature Tsr. Thus, given the flow rate difference $\Delta Q$, the second corrector means 23b can calculate the correction necessary for the inlet temperature $\Delta Te$ in order to ensure that the cell 1 functions well. It should be observed that this correction can be applied both to positive saturation and to negative saturation of the flow rate. Naturally, the second corrector means 23b does not change the setpoint input temperature Ter when there is no flow rate saturation. Furthermore, when performing open-loop regulation of the setpoint inlet temperature Ter, the temperature-compensation function of the second control loop 7 is inhibited.

More particularly, the second corrector means 23b comprise a second integrator 31b provided with amplitude protection means (anti-windup means). Thus, the second integrator 31b is protected in terms of speed and amplitude by the anti-windup function. Furthermore, said zones may be installed upstream from the integrator 31b in order to limit the consequences of fluctuations or noise in the vicinity of zero.

The third filter means 25c serve to filter the inlet temperature correction ΔTe.

The adder means 33 serve to add the temperature correction ΔTe to the predetermined setpoint inlet temperature Ter in order to define the signal for controlling the inlet temperature Tec that is sent to the cold source 11 in order to act on the temperature actuator 13b of the cooling circuit 9. Thus, the signal controlling the inlet temperature Tec serves to act on the inlet temperature of the cooling fluid in order to compensate for a potential temperature disturbance caused by a flow rate difference.

Thus, the function of the second control loop 7 is to specify a new setpoint for the temperature of the cooling fluid if the cooling capacities are not covered by the flow rate correction performed by the first control loop 5.

It should be observed that if, after saturation, the flow rate returns into the operating range, it is advantageous to maintain the temperature setpoint unchanged in order to avoid coupling that could lead to oscillations between the first and second control loops 5 and 7. Nevertheless, a negative flow rate saturation can enable the temperature to be raised in order to return to the initial setpoint situation (i.e. the command inlet temperature Tec equal to the setpoint inlet temperature Ter).

Figure 4:
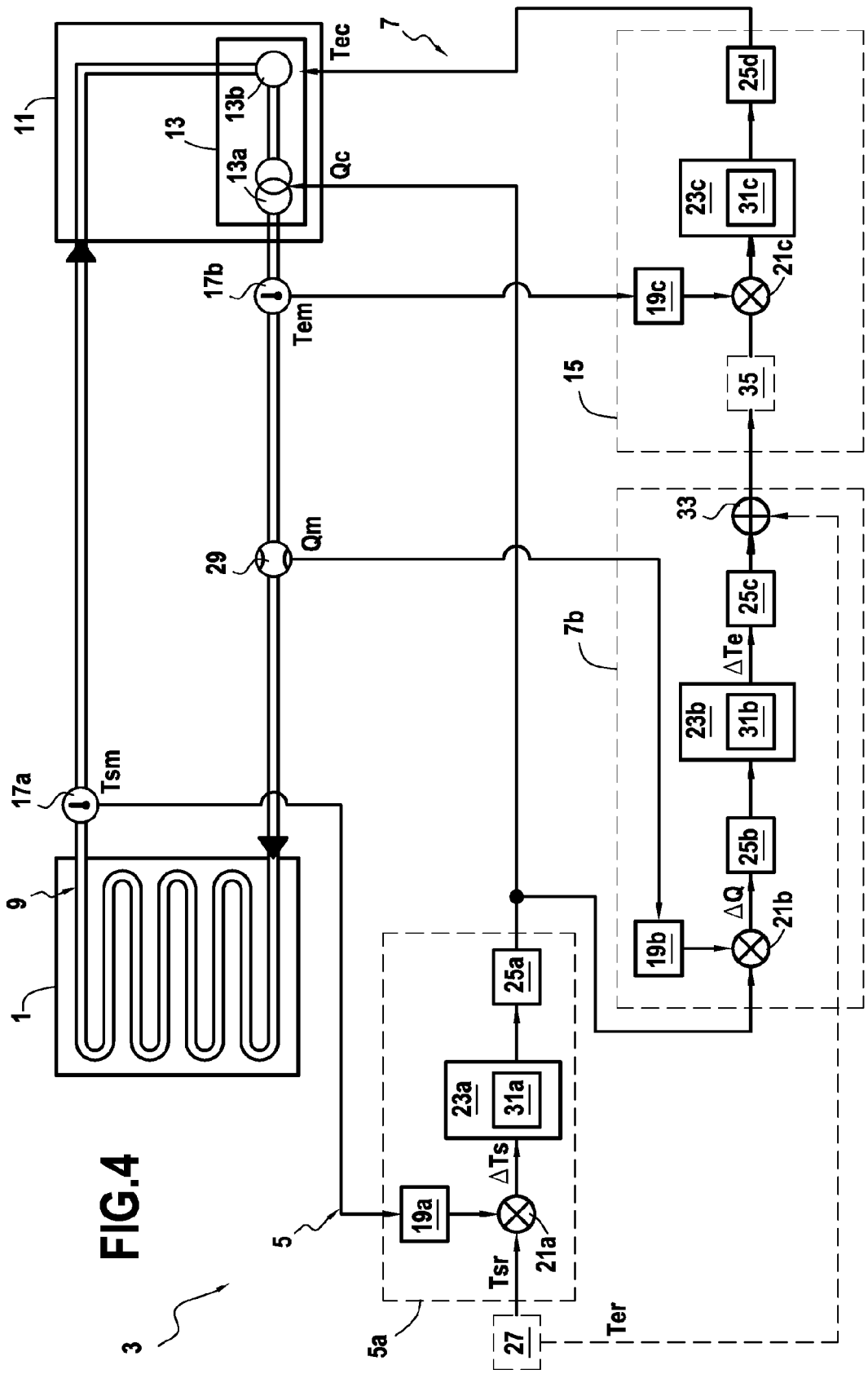
FIG. 4 is a more detailed view of an embodiment of the fuel cell temperature regulation system of FIG. 2.
Figure 5:
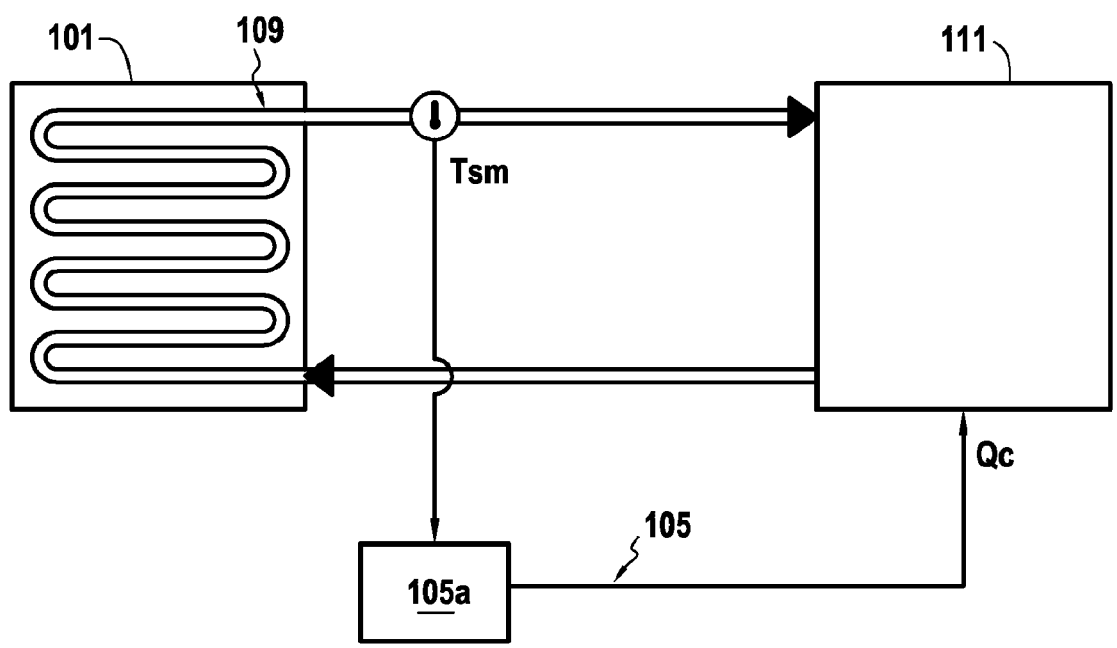
FIG. 5 is a diagrammatic view of a prior art system for regulating the temperature of the cell.

FIG. 4 is a more detailed view of an embodiment of the FIG. 2 system for regulating the temperature of the fuel cell.

The embodiment of FIG. 4 differs from that of FIG. 3 by the fact that it further includes temperature correction means 15 having a second temperature sensor 17b, third validation means 19c, third comparator means 21c, third correction means 23c, and fourth filter means 25d.

The temperature correction means 15 serve to compensate for errors in terms of inlet temperature of the cell 1. They serve to cover uncertainties in the temperature regulation of the cold source 11 and to compensate for heat losses from the feed line between the cell 1 and the cold source 11. In addition, the temperature correction means 15 act continuously to compensate for any drift in the measurement sensors or variation in the heat exchange coefficients within the apparatus over time, thereby contributing to increasing the lifetime of the fuel cell.

More particularly, the second temperature sensor 17b serves to measure the inlet temperature Tem of the cooling fluid on inlet to the cell 1. It should be observed that the second temperature sensor 17b can correspond to a plurality of temperature sensors for taking a plurality of measurements in parallel.

The third validation means 19c serve to validate the measured inlet tubular endpiece Tem. As above, a plurality of temperature measurements may be taken in parallel prior to being filtered and validated by the third validation means 19c in order to ensure that the measured inlet temperature Tem is correct.

The third comparator means 21c serve to compare the validated measured value for the inlet temperature Tem with the value of the command inlet temperature Te in order to detect any inlet temperature difference.

The third corrector means 23c serve to adapt the command inlet temperature Tec as a function of any such inlet temperature difference. As above, the third corrector means 23c include a third integrator 31c provided with amplitude protection means (anti-windup means). Thus, the third integrator 31c serves continuously to modify the inlet temperature setpoint issued to the cold source 11 in order to guarantee the proper temperature for the cooling fluid at the inlet to the cell 1.

The fourth filter means 25d serves to filter the command inlet temperature Tec in order to limit temperature amplitude so as to comply with constraints of the apparatus.

Optionally, the temperature correction means 15 may include further filter means 35 (shown in dashed lines) between the adder means 33 and the third comparator means 21c.

Thus, the temperature regulation system 3 of the invention responds to disturbances derived from interface conditions or drift in components that are internal to the system. These disturbances, due to degraded or modified performance concerning the operating point are generally of the very low frequency type. In general, these unsteadinesses are smaller by at least one decade than the regulation passband.

More particularly, the validation means 19a, 19b, and 19c enable temperature or flow rate measurement data or parameters to be acquired with a predetermined period, each of the measurements to be filtered (e.g. by applying a second order filter), each of the measurements to be validated relative to its physical range, and a coherence test to be performed amongst the various measurements. Thus, all of the temperature or flow rate measurement data needed for controlling the system is validated. In the event of failure, the regulation system 3 takes on an open loop configuration based on a secure operating point.

The filter means 25a to 25d and 35 serve to limit the commands and their rates of change as delivered to the control members or actuators 13a and 13b.

In addition, the corrector means 23a to 23c advantageously include integrators 31a to 31c that are provided with anti-windup means that make it possible to avoid commanding the control actuators 13a and 13b by issuing orders that are excessive relative to the natural dynamic ranges of these actuators, and to protect the system against commands varying too quickly.

It should be observed that the temperature regulation system can be implemented as one or more electronic cards that may conventionally comprise a processor unit, one or more memories, an input unit, and an output unit adapted to implementing measurement validation means, command and safety management means, and servo-control means of the invention.

What is claimed is:

1. A method of regulating the temperature of a fuel cell that is cooled by a cooling fluid passing through the cell via a cooling circuit, the method comprising the following steps:
  measuring a temperature Tsm of the cooling fluid within the cooling circuit at an outlet of the fuel cell;
  specifying a command flow rate Qc for said cooling fluid in said cooling circuit as a function of said temperature measurement;
  applying the command flow rate Qc in said cooling circuit;
  measuring an actual flow rate Qm of the cooling fluid within the cooling circuit;

comparing the measured flow rate Qm to the applied command flow rate Qc to determine a difference therebetween; and establishing a command temperature Tec of the cooling fluid in the cooling circuit as a function of the difference between the measured actual flow rate Qm of the cooling fluid within the cooling circuit and the applied command flow rate Qc, to compensate for failure of fuel cell temperature regulation caused by said flow rate difference.

2. A method according to claim 1, including a temperature correction step for correcting the command temperature Tec of the cooling fluid as a function of a difference between the command temperature Tec and a measured temperature Tem of the cooling fluid at the inlet of the fuel cell.

3. A method of regulating a temperature of a fuel cell that is cooled by a cooling fluid passing through the fuel cell via a cooling circuit, the method comprising:

providing a first control loop in the cooling circuit that is capable of:

measuring a temperature Tsm of the cooling fluid within the cooling circuit at an outlet of the fuel cell;

specifying a command flow rate Qc for said cooling fluid in said cooling circuit as a function of said temperature measurement; and applying the command flow rate Qc in said cooling circuit; and providing a second control loop in the cooling circuit that is capable of:

measuring an actual flow rate Qm of the cooling fluid within the cooling circuit; and establishing a command temperature Tec of the cooling fluid in the cooling circuit as a function of a difference between the measured actual flow rate Qm of the cooling fluid within the cooling circuit and the applied command flow rate Qc, to compensate for failure of fuel cell temperature regulation caused by said flow rate difference.

4. A method according to claim 3 further comprising comparing the measured flow rate Qm to the applied command flow rate Qc to determine a difference therebetween.

5. A method according to claim 3, including a temperature correction step for correcting the command temperature Tec of the cooling fluid as a function of a difference between the command temperature Tec and a measured temperature Tem of the cooling fluid at the inlet of the fuel cell.

6. A method according to claim 3, wherein the second control loop is coupled to the first control loop.

7. A method according to claim 3, wherein the temperature Tsm of the cooling fluid is measured at an outlet of the fuel cell and the command flow rate Qc is applied at an inlet of the fuel cell.

* * * * *